(12) United States Patent
Chen et al.

(10) Patent No.: US 6,531,835 B2
(45) Date of Patent: Mar. 11, 2003

(54) BACK LIGHTING SOURCE MODULE FOR LIQUID CRYSTAL DISPLAY

(75) Inventors: Jason Chen, Hsinchu (TW); Peter Liu, Hsinchu (TW)

(73) Assignee: Ambit Microsystems Corporation, Hsinchu (TW)

( * ) Notice: Subject to any disclaimer, the term of this patent is extended or adjusted under 35 U.S.C. 154(b) by 139 days.

(21) Appl. No.: 09/741,683

(22) Filed: Dec. 18, 2000

(65) Prior Publication Data

US 2002/0075223 A1 Jun. 20, 2002

(51) Int. Cl.$^7$ ................................................ G05F 1/00
(52) U.S. Cl. ........................ 315/307; 315/291; 315/294; 315/DIG. 7
(58) Field of Search ................................ 315/307, 291, 315/224, 297, 310, 279, DIG. 7

(56) References Cited

U.S. PATENT DOCUMENTS 5,612,595 A * 3/1997 Maheshwari ............ 315/200 R
5,796,213 A * 8/1998 Kawasaki ............... 310/316.01
5,854,543 A * 12/1998 Satoh et al. ................. 315/277
6,118,221 A * 9/2000 Kumasaka et al. ... 315/209 PZ

* cited by examiner

Primary Examiner—Don Wong
Assistant Examiner—Tuyet T. Vo
(74) Attorney, Agent, or Firm—Pro-Techtor International

(57) ABSTRACT

A back lighting source module for a liquid crystal display comprises a pulse width modulation (PWM) controller for providing a pulse width signal to control output current of a lighting element. A half bridge converter includes two power transistors connected in series. An output is formed in a middle between the two power transistors. The output is controllable by the signal from the PWM controller to perform alternating opening and closing. A resonance circuit generates a sine-wave voltage to empower the lighting element. A feedback circuit includes a resistor. When a load varies, a voltage signal generated between two ends of the resistor of the feedback circuit timely changes a conductive time of the power transistors of the half bridge converter to complete regulation of current passing through the lighting element.

8 Claims, 5 Drawing Sheets

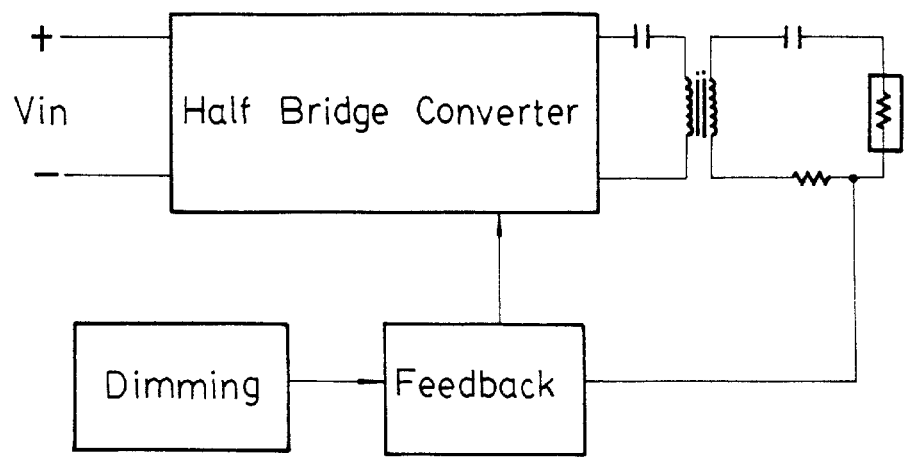
Fig. 1-A
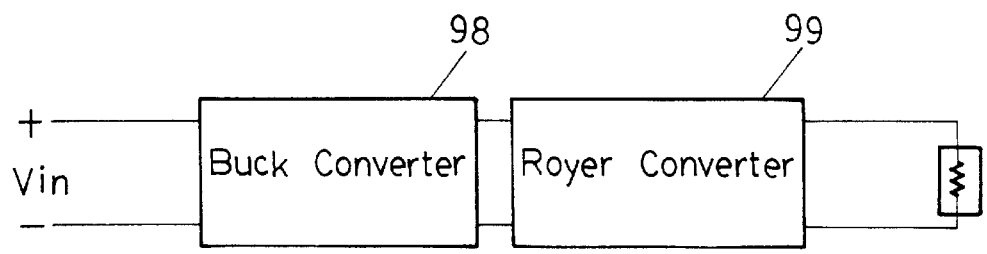
Fig. 4-A (PRIOR ART)
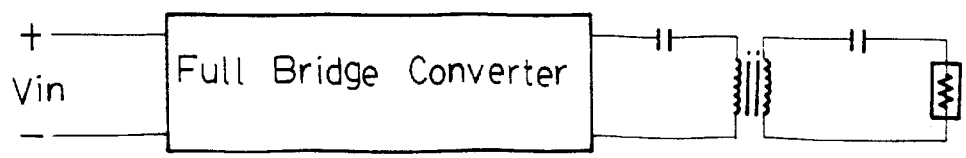
Fig. 3-A (PRIOR ART)

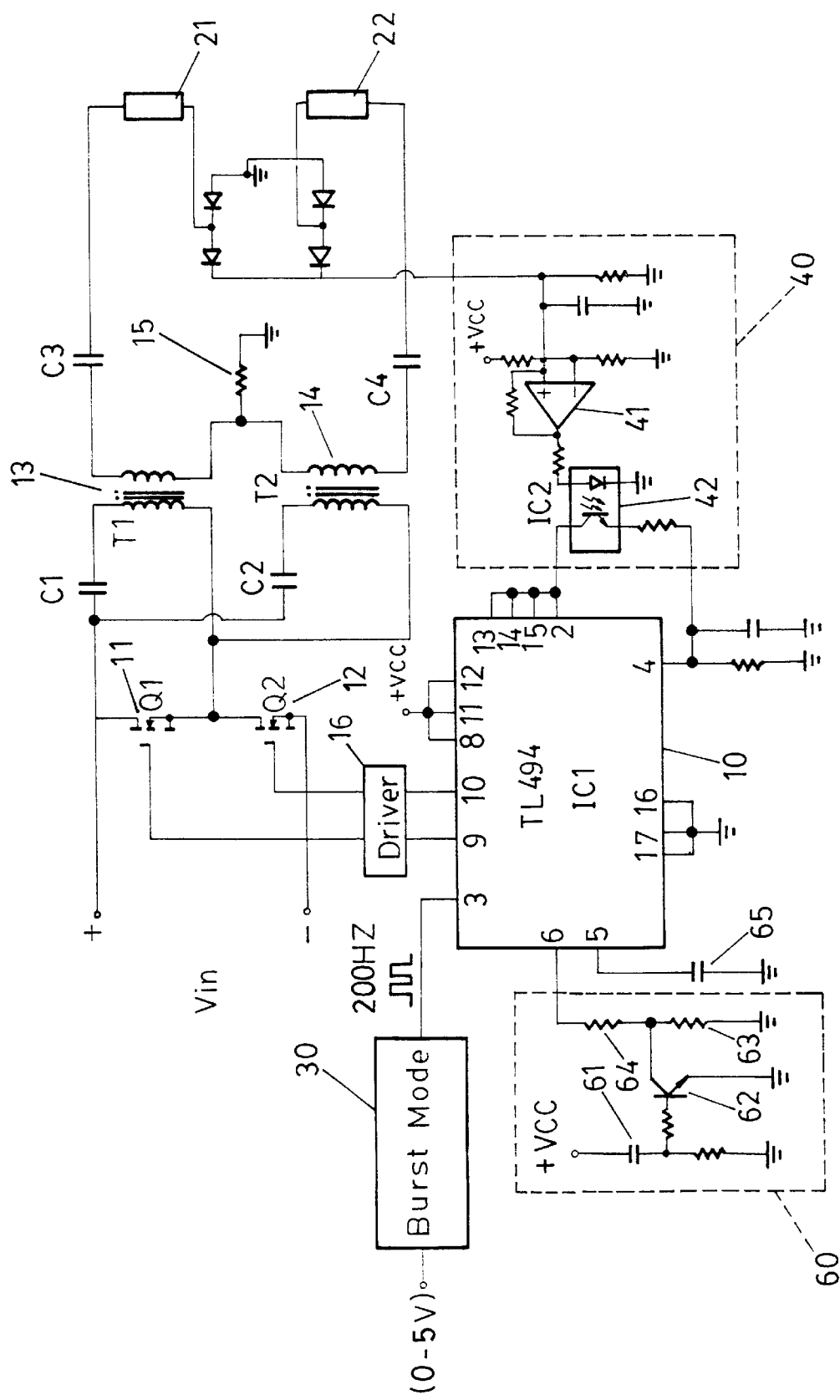
Fig. 1-B

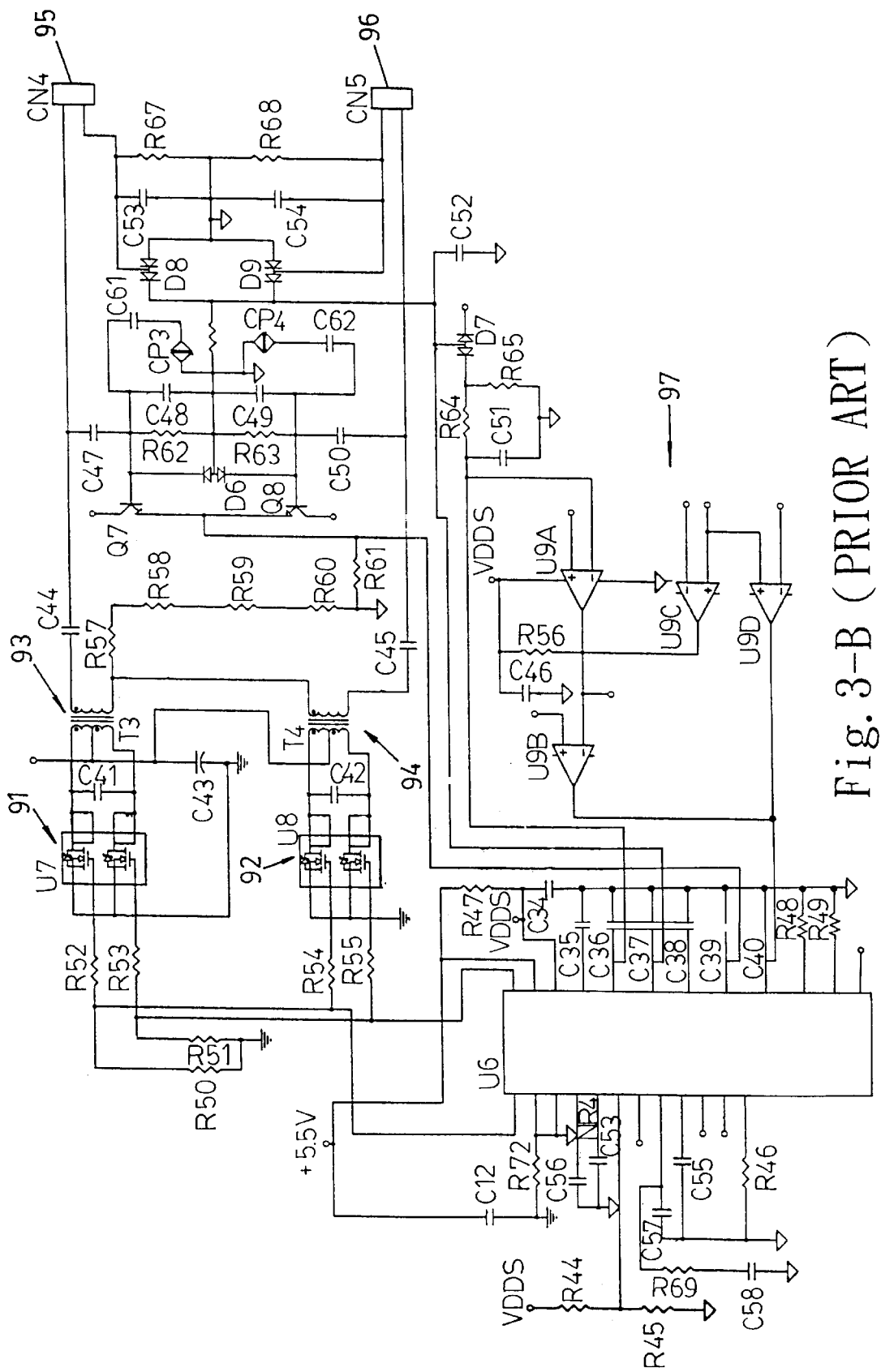
Fig. 3-B (PRIOR ART)

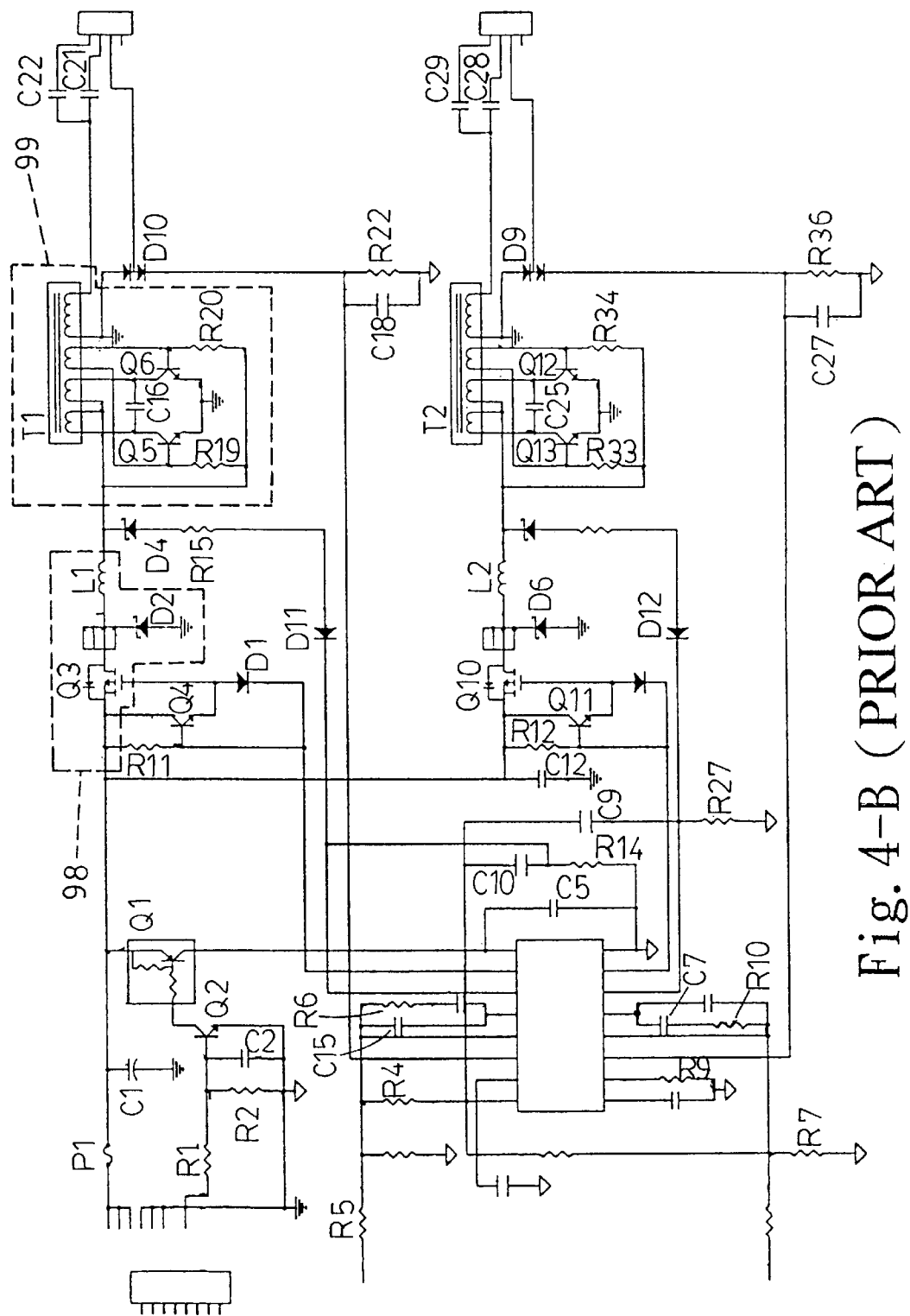
Fig. 4-B (PRIOR ART)

BACK LIGHTING SOURCE MODULE FOR LIQUID CRYSTAL DISPLAY

BACKGROUND OF THE INVENTION

1. Field of the Invention

The present invention relates to a back lighting source module for a liquid crystal display (LCD) that is suitable to be used in LCD monitors and LCD televisions. The back lighting source module includes a circuit that is simple and can be modified easily.

2. Description of the Related Art

A liquid crystal display cannot emit light on its own; namely, a back lighting source is required to illuminate the whole panel of the LCD. FIGS. 3A and 3B illustrate a conventional back lighting supply circuit for an LCD. The circuit includes a full bridge converter that uses a pulse width modulation (PWM) controller 90 to drive two sets of transistors 91 and 92 (four power transistors in total) for activating two transformers 93 and 94. Secondary sides of the transformers 93 and 94 are connected in series with each other, and two lighting elements 95 and 96 are connected with the transformers 93 and 94 in series. A feedback circuit 97 formed by several comparators or operational amplifiers feeds current signals of the lighting elements 95 and 96 back to the PWM controller 90. Thus, by means of continuous feedback control, the lighting elements 95 and 96 are provided with stable power supply and emit light uniformly.

In the above-mentioned LCD back lighting module, it is basically formed by two sets of independent power supplies in order to supply power to the two lighting elements; namely, the uppermost dual transistors 91 and the transformer 93, and the lower dual transistors 92 and the transformer 94. They share the PWM controller 90 and the feedback circuit 97 at best. It merely combines two sets of power supplies together without proceeding with an optimal arrangement of the overall circuit. In addition, the above circuit uses four power transistors, which causes high cost, occupies a larger space, and has a complicated structure.

FIGS. 4A and 4B illustrate another conventional back lighting supply circuit for an LCD. The circuit is a two-stage structure formed by a Buck converter 98 and a Royer converter 99, which has a low efficiency and high cost and occupies a larger space.

SUMMARY OF THE INVENTION

It is the primary object of the present invention to provide a back lighting source module for an LCD, wherein the module includes only two power transistors for forming a back lighting supply for one ore more lighting elements.

It is another object of the present invention to provide a back lighting source module including a plurality of lighting elements that are connected in series or parallel.

It is a further object of the present invention to provide a back lighting source module that may include a current-limiting circuit when required, thereby balancing the currents in each of the lighting elements such that each lighting element has uniform brightness.

It is still another object of the present invention to provide a back lighting source module including a frequency-variable starting circuit to provide a higher voltage during starting. The voltage returns to a normal value after the lighting elements have been turned on. Thus, the lighting elements are turned on more quickly.

Other objects, advantages, and novel features of the invention will become more apparent from the following detailed description when taken in conjunction with the accompanying drawings.

BRIEF DESCRIPTION OF THE DRAWINGS

FIGS. 1A and 1B illustrate a circuit of a first embodiment in accordance with the present invention.

FIGS. 3A and 3B illustrate a conventional back lighting supply circuit for an LCD.

FIGS. 4A and 4B illustrate another conventional back lighting supply circuit for an LCD.

DETAILED DESCRIPTION OF THE PREFERRED EMBODIMENT

Figure 2:
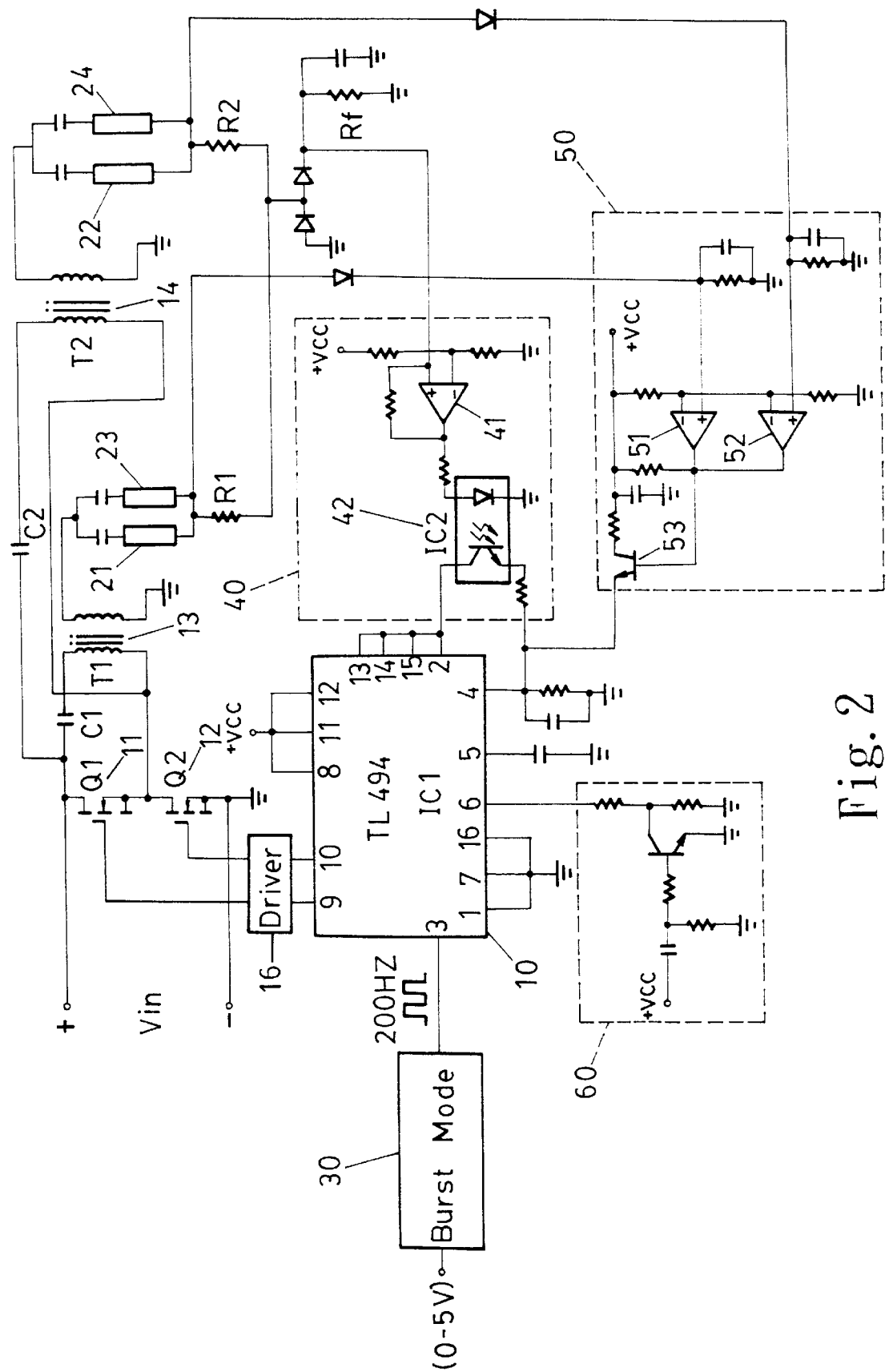
FIG. 2 illustrates a circuit of a second embodiment in accordance with the present invention.

FIGS. 1A and 1B illustrate a first embodiment of a circuit in accordance with the present invention. It includes a half bridge converter. The back lighting source module illustrated in FIGS. 1A and 1B includes a pulse width modulation (PWM) controller 10, two transistors 11 and 12 that form the half bridge converter and controlled by the output of the PWM controller 10, and two transformers 13 and 14 whose primary sides are connected in parallel with a middle point between two transistors 11 and 13. In addition, two lighting elements 21 and 22 are connected in series between the secondary sides of the transformers 13 and 14 to form a series resonance circuit for generating sine waves. The back lighting source module further includes a load-regulation circuit 40 and a brightness-regulation circuit (burst mode) 30.

It is noted that there are only two power transistors 11 and 12 in the back lighting source module. The burst mode 30 in the left portion of the circuit in FIG. 1B is a controller that may change the output of the PWM controller 10. By means of adjusting the conductive rate of rectangular waves outputted by the burst mode 30, the current values passing through the lighting elements 21 and 22 and the brightnesses of the lighting elements 21 and 22 are varied. The load regulation circuit 40 on the lower right portion of the circuit in FIG. 1B catches the current values outputted by the lighting elements 21 and 22 and includes a comparator 41 and a light coupler 42 for feeding a signal back to the PWM controller 10.

At a connecting point between the secondary sides of the transformers 13 and 14, a balance resistor 15 is connected. The difference between the current values of the lighting elements 21 and 22 flows through the balance resistor 15 for reducing current difference of the lighting elements. In addition, a driver 16 may be mounted between the PWM controller 10 and the transistors 11 and 12. The driver 16 is optional (depends upon the magnitude of the outputted drive force of the PWM controller 10).

A frequency-variable starting circuit 60 is mounted to a left side of the PWM controller 10 and includes a capacitor 61, a transistor 62, and two resistors 63 and 64. The operating frequency of the PWM controller 10 is decided by a capacitor 65 and the resistor 64. When the power is on, the capacitor 61 is charged instantly to make the transistor 62 be conductive and make the resistor 63 a short circuit. The transistor 62 turns from a low-impedance state into a high-impedance state gradually. This circuit forms a dynamic circuit of modulating the operating frequency of PWM. Thus, high voltage is generated at the beginning of supply of electricity to turn on the lighting elements. The output voltage is lowered to the rated value after several seconds by means of switching the frequency to the operative frequency. Thus, turning on of the lighting elements is accomplished in an accelerated manner.

The lighting elements can be connected in series, as shown in FIG. 1B. Nevertheless, the lighting elements can be connected in parallel, as shown in FIG. 2. The difference between the circuit in FIG. 2 and the circuit in FIG. 1B is that the secondary sides of the transformers 13 and 14 in FIG. 2 are not connected in series. Instead, each of the transformers 13 and 14 drives the respective lighting element independently. The output of each set may be connected in parallel with two lighting elements 21, 23; 22, 24, thereby forming a back lighting source module for driving four lighting elements.

A current-limiting circuit 50 formed by two comparators 51 and 52 and a transistor 53 12 may be added (see the lower right portion of the circuit in FIG. 2). The current-limiting circuit 50 receives the current values passing through the two sets of lighting elements 21, 23; 22, 24. When the current of one of the sets of the lighting elements exceeds the rated value, a signal is fed back to the PWM controller 10 to automatically reduce the current values of the two sets of the lighting elements 21, 23; 22, 24. Thus, the current values of the lighting elements 21, 23; 22, 24 are kept below the rated current value to avoid large difference in the current values of the two sets of the lighting elements 21, 23; 22, 24.

According to the above description, it is appreciated that the present invention provides a circuit in the form of a half bridge converter such that the back lighting source module needs only two power transistor. The overall structure is simpler than conventional designs. As to the peripheral circuits, a current-limiting circuit and a frequency-variable starting circuit may be added according to need.

Although the invention has been explained in relation to its preferred embodiment, it is to be understood that many other possible modifications and variations can be made without departing from the scope of the invention as hereinafter claimed.

What is claimed is:

1. A back lighting source module for a liquid crystal display, comprising:
    a pulse width modulation (PWM) controller for providing a pulse width signal to control output current of a lighting element;
    a half bridge converter including two power transistors connected in series, an output being formed in a middle between the two power transistors, the output being controllable by the signal from the PWM controller to perform alternating opening and closing;
    a resonance circuit for generating a sine-wave voltage to empower the lighting element; and
    a feedback circuit including a resistor, when a load varies, a voltage signal generated between two ends of the resistor of the feedback circuit timely changes a conductive time of the power transistors of the half bridge converter to complete regulation of current passing through the lighting element.

2. The back lighting source module as claimed in claim 1, further comprising a frequency-variable starting circuit that is connected to an input end of an operative frequency of the PWM controller, the frequency-variable starting circuit including a charging circuit and a dynamic resistor formed by a transistor, such that the lighting element is instantly turned on at the beginning of supply of electricity, the frequency and the voltage are switched back to the operating frequency and a rated output voltage.

3. The back lighting source module as claimed in claim 1, further comprising a plurality of transformers having their primary sides connected in parallel with outputs of the two power transistors and having their secondary sides connected in either series or parallel;
    a current-limiting circuit receiving a current signal from the lighting element for feeding the current signal back to the PWM controller, thereby limiting current supplied to the lighting element; and
    means for regulating brightness of the lighting element.

4. The back lighting source module as claimed in claim 3, wherein the brightness-regulating means includes a burst mode.

5. The back lighting source module as claimed in claim 3, wherein the brightness-regulating means includes a continuous mode.

6. The back lighting source module as claimed in claim 3, wherein the current-limiting circuit includes at least one comparator.

7. The back lighting source module as claimed in claim 3, wherein each of the secondary sides of the two transformers independently and respectively drive a respective lighting element.

8. The back lighting source module as claimed in claim 7, wherein each of the secondary sides of the two transformers independently and respectively drive two respective lighting element, thereby driving four lighting elements in total.

* * * * *